Figure 1:
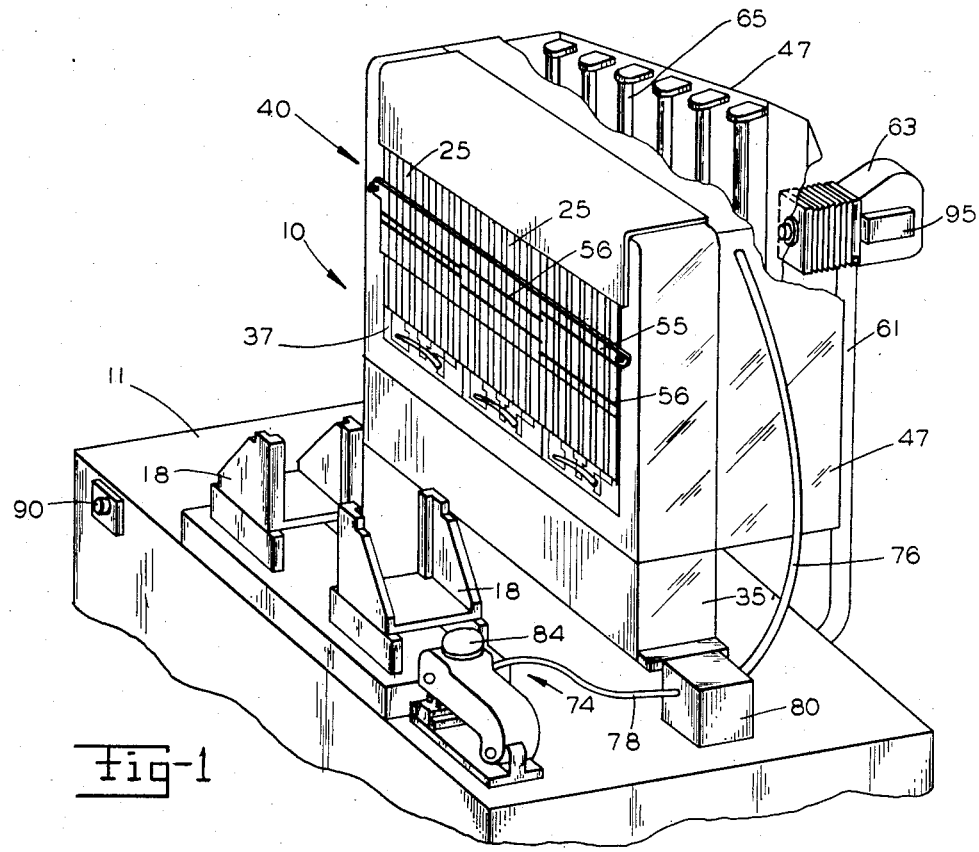

March 24, 1959

L. F. POLK ET AL 2,878,574

GAGING APPARATUS

Filed March 5, 1956

3 Sheets-Sheet 1

INVENTORS
Louis F. Polk
Jesse H. Straw
BY Edward J. Noe Jr.
atty.

March 24, 1959
L. F. POLK ET AL
2,878,574
GAGING APPARATUS
Filed March 5, 1956
3 Sheets-Sheet 2
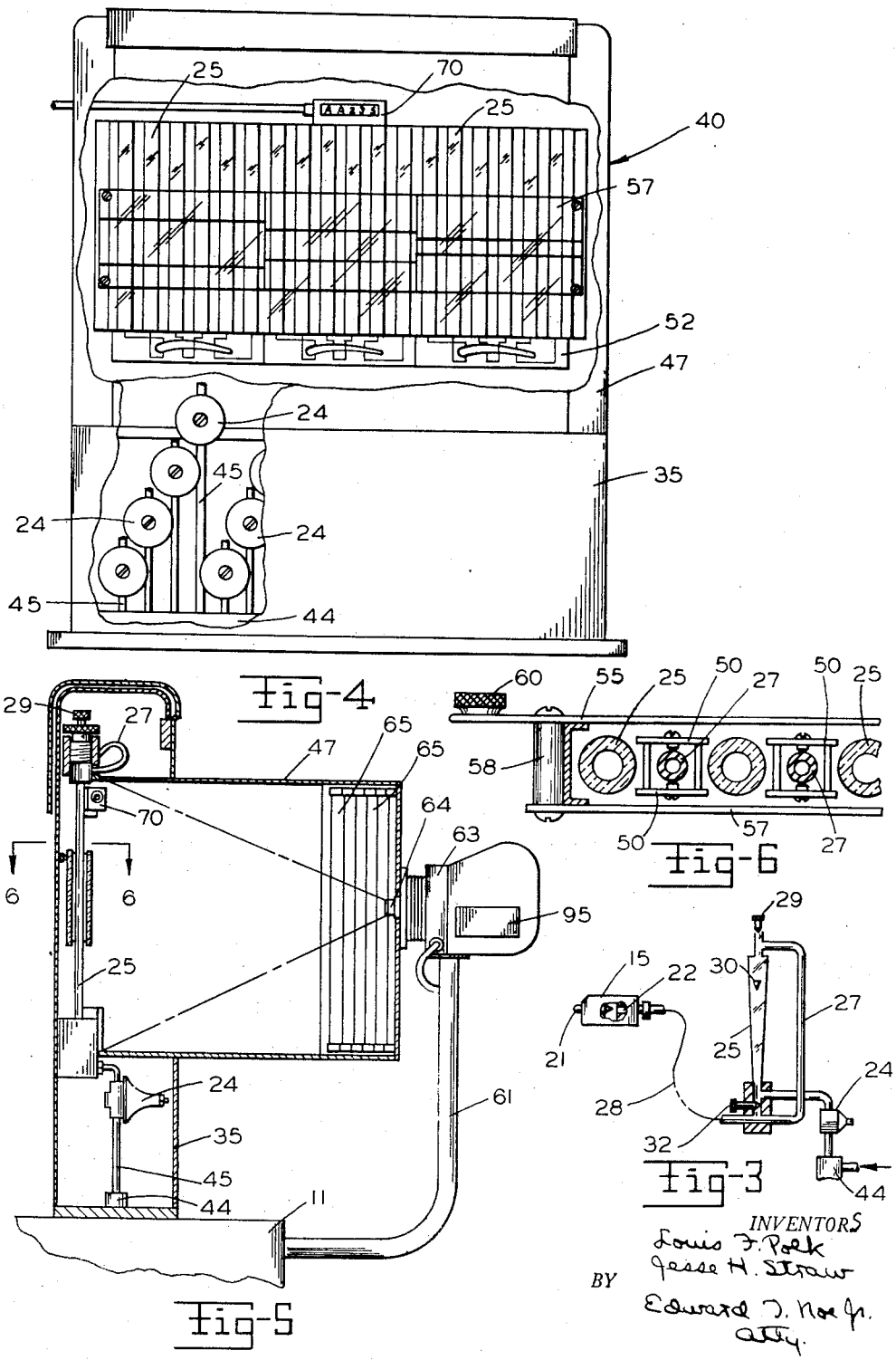
INVENTORS
Louis F. Polk
Jesse H. Straw
BY Edward J. Noe Jr.
atty.

March 24, 1959

L. F. POLK ET AL 2,878,574

GAGING APPARATUS

Filed March 5, 1956

3 Sheets-Sheet 3

INVENTORS
Louis F. Polk
Jesse H. Straw
BY
Edward J. Noe Jr.
Atty.

United States Patent Office 2,878,574
Patented Mar. 24, 1959

2,878,574

GAGING APPARATUS

Louis F. Polk, Dayton, and Jesse H. Straw, Brookville, Ohio, assignors, by mesne assignments, to The Sheffield Corporation, a corporation of Delaware Application March 5, 1956, Serial No. 569,586

5 Claims. (Cl. 33—174)

This invention relates to gaging devices and more particularly to an apparatus for gaging and recording dimensional characteristics of a part.

It is an object of this invention to provide an apparatus for gaging and recording dimensional characteristics of a part in which the particular part gaged is positively identified with the record of its characteristics for later reference.

It is a further object to provide such an apparatus for simultaneously recording indicia identifying the particular part along with its gaged dimensions, similar indicia being placed in association with the part as by stamping thereon, whereby the part and record are correlated.

It is a further object to provide such an apparatus wherein a counter identifying the particular part is photographed simultaneously with the indicated dimensional characteristics of the part, a part stamping means having indicia similar to that of the counter being operated in synchronism with the counter.

It is a further object to provide an apparatus for gaging and recording the dimensional characteristics of a part wherein the indicated dimensions of the part and a part counter are simultaneously photographed and recorded, and a stamp operated in conjunction with the counter is used to apply a similar indicia to the part for subsequent correlation of the record and part.

It is a further object to provide a gaging apparatus including vertically disposed adjacent indicating tubes exposed at each side of an indicating panel and wherein a pair of slides at each side of the panel and simultaneously adjustable along the tubes include reference indicia for particular part characteristics.

It is a further object to provide an apparatus for gaging and recording dimensional characteristics of a part such as a fluid reactant blade, wherein an indicating panel of vertically disposed indicating tubes is responsive to air leakage gaging means at one side of the panel, counter means being mounted adjacent the indicating panel and operated in synchronism with stamping means adjacent the gaging means, a camera being provided for photographing the side of the panel remote from the gaging means to simultaneously record the dimensional characteristics of the blade and the counter.

Figure 2:
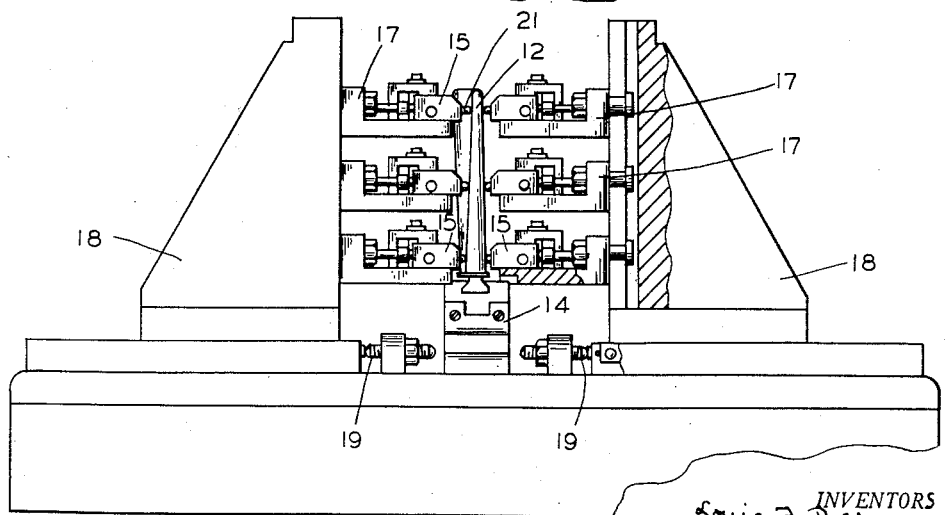
Figure 7:
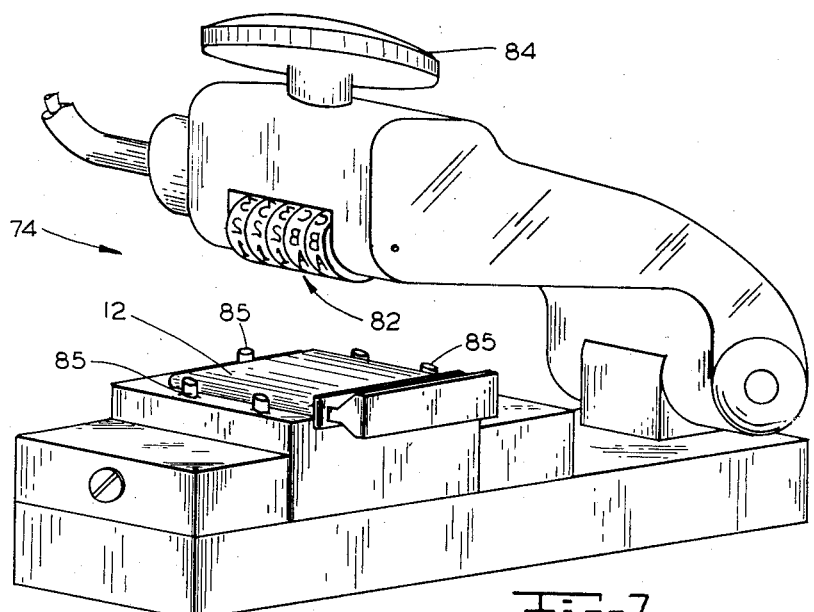
Figure 9:
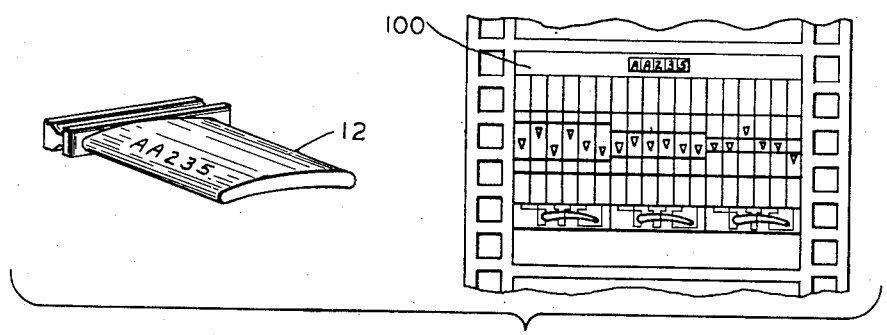
Figure 8:
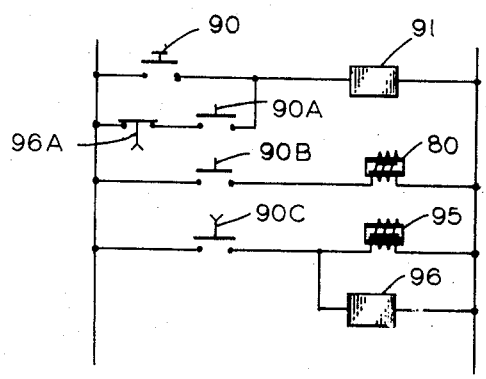

Other objects and advantages of the invention will be apparent from the following description, the appended claims, and the accompaying drawings, in which, Figure 1 illustrates in perspective, and partially broken away, an apparatus for gaging and recording the dimensional characteristics of a fluid reactant blade and embodying the present invention, Figure 2 is a front view of the gaging means of the apparatus, Figure 3 is a diagrammatic circuit showing the air flow for one of the indicating tubes and its associated air leakage gaging means, Figure 4 is a rear view of the indicating panel with the housing partially broken away, Figure 5 is a central vertical section through the indicating panel and the recording camera, Figure 6 is a fragmentary section on line 6—6 of Figure 5, Figure 7 is a perspective view of an exemplary stamping mechanism for placing an identifying indicia in association with the part, Figure 8 is a diagram of an electrical circuit for automatically timing the operation of the apparatus, and Figure 9 shows a blade and film strip portion to illustrate their common identification and the recorded dimensional characteristics.

The present invention provides an apparatus for gaging dimensional characteristics of a part and recording the gaging results with positive identification of the part and its corresponding record. The illustrated application is particularly provided for gaging dimensional characteristics of a fluid reactant blade such as a turbine or compressor blade of an aircraft turbine. It will be understood that the apparatus itself is not limited to the specific form illustrated and that it would have application to gaging and recording the dimensional characteristics of other materially different parts.

In this exemplary application a blade is placed in a gaging station and its dimensions are gaged and indicated. For example, a part can be gaged at a series of points on each side at different levels to obtain indications of its contour and thickness. The dimensional characteristics indicated are recorded by photographing the indicated gaging results. It is necessary that the photographed dimensional characteristics be positively identified with the particular blade. A counter is supported adjacent the indicating means and is connected to a blade stamping device supported adjacent the gaging means. The camera, counter, and stamping device are operatively interconnected by a suitable control system.

Through this system the operator, by depressing a button, initiates an automatic sequential operation in which the counter and stamp are simultaneously indexed, following which the counter and indicating means are simultaneously photographed. The adjusted stamp is used to apply the selected indicia on the gaged blade. Through use of this apparatus a permanent record is thus provided and film portions and the blades to which they pertain can be readily correlated.

This apparatus has particular importance in the gaging of aircraft turbine or compressor blades, as previously mentioned. In one manner of processing of such parts if the dimensional characteristics thereof are satisfactory, the parts are passed through inspection. However, a part which deviates from the desired limits is put aside for review to determine if it can be salvaged or properly employed in an engine. When such a system is being practiced the present apparatus could be employed to gage each of the production blades but the recording and identifying apparatus would not be used unless the blade deviated from normal limits. The photograph with its identifying number along with the stamped part having the same number would then be positively correlated for review.

Referring more particularly to the drawings, the illustrated apparatus comprising a gaging and indicating station 10 mounted on a base 11. This station includes gaging means illustrated in Figure 2. A blade 12 to be gaged is mounted in a clamp 14 and opposed air leakage gaging units 15 supported on platforms 17 are carried to and from gaging position when carriers 18 are actuated. The blade is gaged at a plurality of chordal locations at each level. Stops 19 limit the inward carrier positions.

Each gaging unit 15 (see Figure 3) has a movable work contactor 21 controlling the leakage through an orifice 22 connected to an indicating means. Air from a suitable source passes through a regulator 24, upward through a transparent internally tapered flow tube 25, through a conduit 27 and tubing 28 to unit 15. An adjustment at 29 serves to bleed an adjusted amount of air to atmosphere at the upper end of the tube for controlling the position of an indicating float 30 during set-up. Amplification can be varied by turning the adjustment 32 to control the proportion of air by-passed directly to the gaging unit from the regulator 24 and around tube 25.

A support 35 on base 11 carries tubes 25 in adjacent parallel relationship. The interconnections of the respective tubes 25 with the air leakage gaging units 15 on platforms 17 are shown by the diagram plate 37 at the forward face of the indicating panel 40. The lower, middle, and upper blade levels are shown respectively from left to right across this panel and the opposed relationship of the gaging units in three locations across each blade are indicated.

When carriers 18 are moved inward against stops 19, work contactors 21 engage the blade 12 and its dimensional characteristics are presented on panel 40 through the positions of the indicating floats within tubes 25. Through adjustment of float positioning adjustments 29 and amplification adjustments 32 floats 30 can be arranged in any predetermined relationship across panel 40 with a blade of nominal contour in gaging position. For example, it is assumed in the illustrated application that floats 30 have been adjusted to a horizontal straight line relationship across the panel for a nominal part.

Regulators 24 for the various tubes 25 are carried above a manifold 44 by pipes 45 having different lengths so that the regulators can be compactly overlapped. A similar gaging unit and carrier arrangement is described in more detail in a co-pending application of Willis Fay Aller, Serial Number 194,181, filed November 4, 1950.

The rear portion of indicating panel 40 is enclosed by a light tight housing 47 cooperating with a light source and a camera as later described. In Figure 4 this housing 47 has been partially broken away to reveal the rear side of panel 40. Indicating tubes 25 are exposed at both sides of the panel. Referring more particularly to Figure 6 it will be seen that conduits 27 leading downward from the upper ends of the flow tubes are led between the tubes and lie in a common plane therewith. Strips 50 at each side of conduits 27 can be suitably calibrated if desired. Diagram plate 52 at the lower ends of tubes 25 is similar to plate 37 at the forward face of the panel and indicates the interconnections of the flow tubes with gaging units 15.

A transparent panel 55 of plastic or the like extends across the forward face of tubes 25 and has reference lines 56 thereon at desired tolerance limits for the indicated blade configuration. For example if the operator standing adjacent the gaging means of Figure 2 observes that all the indicating floats at the respective blade levels fall within the range defined by the tolerance lines 56 he knows that the part or blade is satisfactory in configuration. A similar panel 57 extends across the rear surface of tubes 25 and is connected through spacers 58, one of which appears in Figure 6, with forward panel 55. Knobs 60 connected to panel 55 serve to simultaneously slide the panels 55 and 57 along tubes 25.

An electrically controlled camera 63 of a commercially available type is supported from base 11 by an arm 61. Housing 47 cooperates with the lens opening 64 of camera 63 and supports a series of fluorescent tubes 65 in this example, providing illumination for the rear section of indicating panel 40. Camera 63 will automatically photograph the float positions within tubes 25, rearward reference panel 57, and interconnection diagram 52 to provide a complete disclosure of the dimensional characteristics of the particular blade.

Identifying means are provided for this apparatus to insure that the proper photograph is identified with its particular blade. As illustrated, this identifying means includes a counter 70 and a stamping unit 74. The stamping means can comprise any mechanism for placing an identification in association with the part preferably by stamping the part itself.

Counter 70 and stamping device 74 each have similar adjustable indicia. A flexible shaft 76 leads to counter 70 for indexing thereof and a similar flexible shaft 78 serves to index stamping unit 74 in a conventional manner. Shafts 76 and 78 are both simultaneously and equally actuated by a solenoid drive 80 not shown in detail to insure synchronism.

In the illustrated embodiment stamping unit 74 includes rollers 82. Upon depression of palm plate 84 these adjusted rollers are carried into engagement with blade 12 located by pins 85 to print an identification on the blade.

In normal operation of the apparatus when the operator observes that the blade 12 being gaged is not within the desired tolerance lines on panel 55 he depresses a switch button 90 at the forward face of base 11. An automatic sequential actuation of the counter, stamping device and camera then occurs. Upon energization of solenoid unit 80, counter 70 and stamping device 74 are simultaneously indexed so that their operative indicia correspond. After a predetermined time delay camera 63 is energized to photograph counter 70 and the dimensional characteristics of the blade. The blade is then removed from the clamp 14, located in stamping unit 74 and the selected indicia are printed thereon. In Figure 9 blade 12 has been stamped and the photograph portion 100 that corresponds with this blade is shown in the right-hand portion of that figure. It will be seen that the identifying letters and numbers at the upper portion of the photograph correspond with those stamped on blade 12. The float positions, limit lines, and interconnection diagram are also shown giving a complete picture of the characteristics of the blade.

Figure 8 illustrates an exemplary electrical diagram for carrying out the automatic sequence previously described. When the operator depresses button 90 a timer 91 of a commercially available type is energized. Timer 91 immediately closes normally opened contacts 90a and 90b. Contacts 90a establish a holding circuit to the timer and energization of solenoid 80 through contacts 90b indexes counter 70 and stamp 74. Contacts 90c close after a predetermined time delay for indexing and energizes solenoid 95 in the camera to initiate the camera cycle, photograph the blade identification and dimensional display and advance the film. After a predetermined time delay for the camera cycle, timer 96 opens contacts 96a, de-energizing timers 91 and 96 to terminate the cycle.

The dimensional record in the illustrated application can be used in the form of a photograph or by film projection. If desired an image identical to that at the opposite side of the indicating panel can be obtained by using a counter with reverse form indicia and printing or projecting the film for the reverse image to that actually photographed. Commercially available continuous developing equipment can be used if expedient.

Thus it is seen that an apparatus has been provided for rapidly and efficiently processing parts to be gaged and recording their dimensional characteristics. Through use of the present apparatus dimensional records can be positively identified with a particular part to which they pertain. The apparatus is simple in construction and reliable in operation through a long service life.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gaging and recording dimensional characteristics of a part such as a fluid reactant blade, comprising a base, a gaging and indicating station on said base, gaging means in said station including air leakage gaging means controlled in accordance with dimensional characteristics of the blade, transparent indicating tubes operatively connected to said air leakage gaging means and including means movable therealong in accordance with the air leakage, means mounting said tubes adjacently and in parallel vertical relationship in a common plane to form an indicating panel, the tubes being exposed at both sides of said panel, said gaging means being mounted at one side of the panel whereby the indicated dimensional characteristics can be readily observed by an operator at the gaging means, a counter on said base adjacent said indicating panel and directed toward the other side thereof, part stamping means on said base adjacent said gaging means, said counter and stamping means having similar adjustable indicia and including interconnection means therebetween for simultaneous indexing, and a camera on said base at the other side of said indicating panel for simultaneously photographing the indicating tubes and counter after adjustment and before part stamping to record the identity of the blade and its dimensional characteristics.

2. An apparatus as set forth in claim 1 wherein each of said transparent tubes has flexible conduits connected to each end thereof, the conduits at one common end of each of the tubes passing between the tubes and lying in a common plane therewith.

3. Apparatus for gaging and recording dimensional characteristics of a fluid reactant blade or the like, comprising a base, a gaging and indicating station on said base, gaging means on said base including air leakage gaging means controlled by dimensional characteristics of the blade, a plurality of indicating tubes in said station operatively connected to said air leakage gaging means and having means movable rectilinearly therealong in accordance with the controlled air leakage, means mounting said tubes in vertical adjacent relationship in a common plane to form an indicating panel in which the tubes are exposed at both sides thereof, said gaging means being mounted at one side of said panel whereby the indicated dimensional characteristics of the blade are readily observed by an operator at the gaging means, adjustable identifying means on said base adjacent said panel, part stamping means on said base adjacent said gaging means, said identifying and stamping means having similar adjustable indicia and including interconnection means therebetween for simultaneous adjustment to insure synchronism, reference panels at both sides of said indicating tubes and extending thereacross, means interconnecting said reference panels for simultaneous movement along the tubes, said panels having similar indicia thereon for reference blade dimensions, and a camera mounted on said base at the other side of said indicating panel for simultaneously photographing the indicating tubes and the adjacent reference panel to record the identity of the blade and its dimensional characteristics.

4. Apparatus for gaging and recording dimensional characteristics of a fluid reactant blade or the like, comprising a base, a gaging and indicating station on said base, means in said station including air leakage gaging means controlled by dimensional characteristics of the blade, transparent indicating tubes operatively connected to said indicating means and having means movable therealong in accordance with the controlled air leakage, means mounting said transparent tubes vertically and adjacent in a common plane to form an indicating panel in which the tubes are exposed at each side thereof, a counter on said base adjacent said indicating panel, said gaging means being at one side of said panel whereby the indicated dimensional characteristics are readily observed by an operator at the gaging means, a counter on said base adjacent said indicating panel, stamping means on said base adjacent said gaging means, said counter and stamping means having similar adjustable indicia and including interconnection means therebetween for simultaneous adjustment thereof, a camera on said base at the opposite side of said panel for simultaneously photographing the indicating tubes and counter to record the identity of the part and its dimensional characteristics, and control means operatively connected to said interconnection means and said camera for automatically indexing the counter and stamping means and photographing the display in a predetermined sequential relationship.

5. Apparatus for gaging and recording dimensional characteristics of a part, comprising a base, a gaging station on said base including air leakage gaging means controlled by the part dimensions for simultaneously gaging a plurality of dimensions of a part, vertically disposed indicating tubes connected to said gaging means and having indicating means responsive to the air leakage flow for displaying said dimensions in contour defining relation, means mounting said tubes adjacently and in a common plane to form an indicating panel in which the tubes are exposed on both sides, whereby an operator at one side can readily observe the indicated dimensional characteristics, identifying means for the part including means for indicating the part identity and placing a corresponding indicia in association with the part, and means for simultaneously recording on a record separate from the part both the part identity and the gaged dimensional characteristics thereof including a camera at the opposite side of said panel for simultaneously photographing the indicating tubes and the means for indicating the part identity, whereby the recorded data is readily identified with the particular part in subsequent reference.

References Cited in the file of this patent

UNITED STATES PATENTS

| | | |
|---|---|---|
| 1,550,735 | Ogsbury | Aug. 25, 1925 |
| 2,723,876 | Lutz | Feb. 24, 1942 |
| 2,278,357 | Madden | Mar. 31, 1942 |
| 2,336,081 | Finnegan | Dec. 7, 1943 |
| 2,392,890 | Vincent | Jan. 15, 1946 |
| 2,501,538 | Ruska | Mar. 21, 1950 |
| 2,641,523 | Beckman | June 9, 1953 |
| 2,692,539 | Houghton | Oct. 26, 1954 |

OTHER REFERENCES

American Digest, page 185, Jan. 16, 1947.
Journal of Applied Physics, page 1152.